United States Patent [19]
Kawai et al.

[11] Patent Number: 6,141,047
[45] Date of Patent: *Oct. 31, 2000

[54] IMAGE SIGNAL PROCESSING APPARATUS AND IMAGE PICKUP DEVICE

[75] Inventors: Kenji Kawai, Tokyo; Koji Takahashi, Chigasaki, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/744,272

[22] Filed: Nov. 6, 1996

Related U.S. Application Data

[62] Division of application No. 08/357,329, Dec. 16, 1994.

[30]     Foreign Application Priority Data

Dec. 22, 1993   [JP]   Japan ..................................... 5-324255
Dec. 22, 1993   [JP]   Japan ..................................... 5-324256

[51] Int. Cl.$^7$ ............................... H04N 5/202; H04N 9/73
[52] U.S. Cl. ........................................... 348/254; 348/224
[58] Field of Search .................................. 348/254, 690, 348/230, 644, 224, 362

[56]          References Cited

U.S. PATENT DOCUMENTS

| | | | |
|---|---|---|---|
| 4,821,100 | 4/1989 | Yamamoto | 348/690 |
| 5,185,656 | 2/1993 | Yamamoto | 348/257 |
| 5,194,960 | 3/1993 | Ota | 348/224 |
| 5,221,963 | 6/1993 | Hashimoto et al. | 348/234 |
| 6,023,533 | 2/2000 | Sano et al. | 348/254 |

*Primary Examiner*—Wendy Garber
*Assistant Examiner*—Jacqueline Wilson
*Attorney, Agent, or Firm*—Fitzpatrick, Cella, Harper & Scinto

[57]          ABSTRACT

Fine operation processing such as nonlinear processing is performed in units of frames in correspondence with each photographing frame. In order to effectively utilize the dynamic range of a digital processing circuit, there is provided an image processing apparatus which includes a varying circuit for varying the signal level in correspondence with the photographing contents, an A/D converter for converting an output varied by the varying circuit into a digital signal, an image memory for storing image information output from the A/D converter, an evaluation circuit for evaluating the image information, an operation circuit for performing operation processing of a signal output from the image memory, and a control circuit for controlling the varying circuit and the operation circuit on the basis of the evaluation result of the evaluation circuit. There is also provided an image pickup device in which the varying circuit includes an iris control circuit, a shutter speed control circuit, or a gain control circuit, and varies the signal level using the circuit.

5 Claims, 8 Drawing Sheets

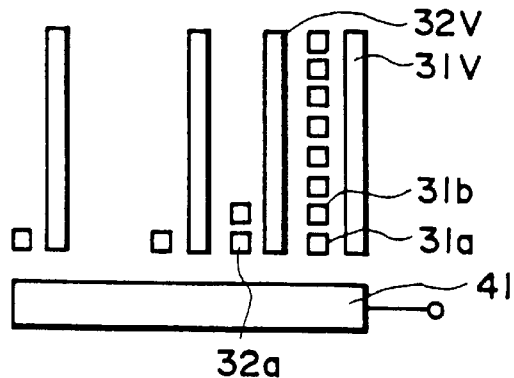
FIG. 8
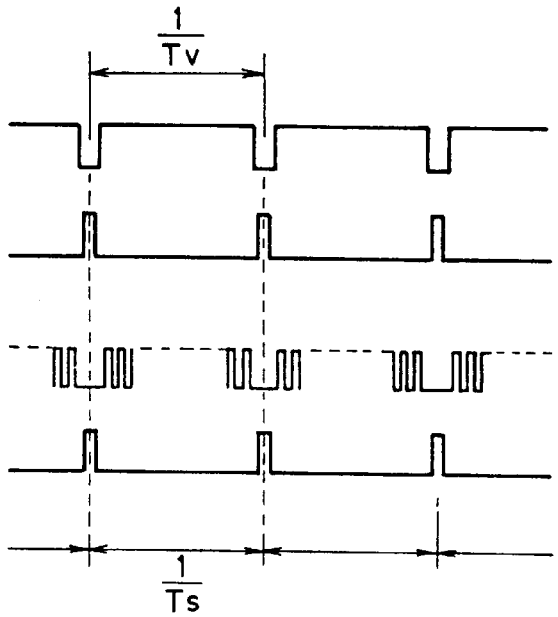
FIG. 9(a) VERTICAL BLANKING PULSE
FIG. 9(b) READ-OUT PULSE
FIG. 9(c) VERTICAL TRANSFER PULSE
FIG. 9(d) RESET PULSE
FIG. 9(e) ACCUMULATION TIME
Tv : FIELD PERIOD
$\frac{1}{Tx}$ : TIME REQUIRED FOR THAT PHASE OF FOCUS MODULATION WAVE BECOMES ZERO IN REFERENCE TO VERTICAL BLANKING PULSE
$\frac{1}{Ts}$ : ACCUMULATION TIME FIG. 10(a) VERTICAL BLANKING PULSE 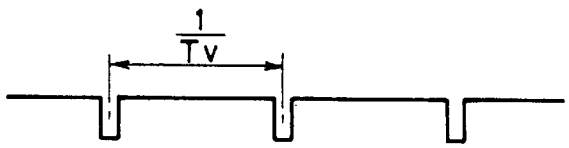
FIG. 10(b) READ-OUT PULSE 
FIG. 10(c) VERTICAL TRANSFER PULSE 
FIG. 10(d) RESET PULSE 
FIG. 10(e) ACCUMULATION TIME 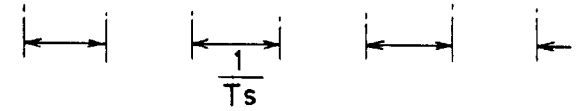
Tv : FIELD PERIOD
$\dfrac{1}{Tx}$ : TIME REQUIRED FOR THAT PHASE OF FOCUS MODULATION WAVE BECOMES ZERO IN REFERENCE TO VERTICAL BLANKING PULSE
$\dfrac{1}{Ts}$ : ACCUMULATION TIME

IMAGE SIGNAL PROCESSING APPARATUS AND IMAGE PICKUP DEVICE

This application is a division of application Ser. No. 08/357,329 filed Dec. 16, 1994.

BACKGROUND OF THE INVENTION

1. Field of the Invention

The present invention relates to an image processing apparatus and an image pickup device and, more particularly, to an image processing apparatus and an image pickup device, which are suitably used in control for optimizing the dynamic range of an image processing circuit.

2. Related Background Art

In general, a conventional image pickup device has an arrangement shown in the block diagram in FIG. 1. Incident light is photoelectrically converted by a CCD 20, and the output signal from the CCD 20 is subjected to gain control in an AGC circuit 21. The output signal from the AGC circuit 21 is converted into a 10-bit digital signal by an A/D converter 22. The digital signal is subjected to normal γ correction in a γ-correction circuit 23, and a high-luminance signal is nonlinearly suppressed by a KNEE circuit 24, thus assuring a certain dynamic range. The output compressed by the KNEE circuit 24 is supplied to a signal processing circuit 25 which performs image calculation processing at a resolution of 8 bits. The output signal from the signal processing circuit 25 is output as a color video signal, and is also input to an AE circuit 26 to control the iris and shutter speed. The output signal from the AE circuit 26 is supplied to the AGC circuit 21.

In such the conventional image pickup device, nonlinear processing such as KNEE correction is performed based on a 10-bit digital signal, and signal processing is executed at a resolution of 8 bits on the basis of information obtained by the nonlinear processing, resulting a narrow dynamic range of a high-luminance signal.

Since the iris, shutter speed, and gain are controlled on the basis of information output from the 8-bit signal processing circuit, the dynamic range of the digital processing circuit cannot often be fully utilized.

SUMMARY OF THE INVENTION

It is, therefore, an object of the present invention to provide an image signal processing apparatus which can perform accurate calculation processing in units of frames in accordance with a photographing frame in consideration of the above situation.

It is another object of the present invention to provide an image processing apparatus and an image pickup device, which can perform accurate operation processing in units of frames in accordance with a photographing frame in consideration of the above situation and can effectively utilize the dynamic range of a digital processing circuit.

An image signal processing apparatus according to one embodiment of the present invention comprises image memory means for storing an input signal, evaluation means for evaluating an image of the input signal, operation means for performing operation processing of a signal output from the image memory means, and control means for controlling the operation means in accordance with the evaluation result of the evaluation means.

An image processing apparatus according to another embodiment of the present invention comprises varying means for varying a signal level in correspondence with photographing contents, an A/D converter for converting an output varied by the varying means into a digital signal, image memory means for storing image information output from the A/D converter, evaluation means for evaluating the image information, operation means for performing operation processing of a signal output from the image memory means, and control means for controlling the varying means and the operation means on the basis of the evaluation result of the evaluation means.

An image pickup device according to still another embodiment of the present invention comprises varying means for varying a signal level in correspondence with photographing contents, an A/D converter for converting an output varied by the varying means into a digital signal, image memory means for storing image information output from the A/D converter, evaluation means for evaluating the image information, operation means for performing operation processing of a signal output from the image memory means, and control means for controlling the varying means and the operation means on the basis of the evaluation result of the evaluation means, and the varying means includes iris control means, and varies the signal level using the iris control means.

An image pickup device according to another aspect of the present invention comprises varying means for varying a signal level in correspondence with photographing contents, an A/D converter for converting an output varied by the varying means into a digital signal, image memory means for storing image information output from the A/D converter, evaluation means for evaluating the image information, operation means for performing operation processing of a signal output from the image memory means, and control means for controlling the varying means and the operation means on the basis of the evaluation result of the evaluation means, and the varying means includes shutter speed control means for varying a light accumulation time of photoelectric conversion means, and varies the signal level using the shutter speed control means.

An image pickup device according to a further aspect of the present invention comprises varying means for varying a signal level in correspondence with photographing contents, an A/D converter for converting an output varied by the varying means into a digital signal, image memory means for storing image information output from the A/D converter, evaluation means for evaluating the image information, operation means for performing operation processing of a signal output from the image memory means, and control means for controlling the varying means and the operation means on the basis of the evaluation result of the evaluation means, and the varying means includes gain control means and varies the signal level using the gain control means.

According to the embodiments of the present invention, since the image memory means is arranged, and the operation processing is performed for the output signal from the image memory means, optimal operation processing such as nonlinear processing in units of frames can be executed without a delay time.

The preprocessing of the A/D converter can become close to a standard pattern of digital operations. Furthermore, the conversion range of the A/D converter and the dynamic range of the operation processing can be effectively utilized.

According to the embodiments of the present invention, since the image of the input signal is evaluated, and the operation processing of the input signal is performed based on the evaluation result to obtain a maximum variance, fine processing for each frame can be performed in correspondence with the frame. Since the image memory means is arranged, optimal operation processing in units of frames can be executed without a delay time.

Other objects and features of the present invention will become apparent from the following description taken in conjunction with the accompanying drawings.

BRIEF DESCRIPTION OF THE DRAWINGS

FIG. 8 is a view showing the structure of an interline CCD;

FIG. 9 is a timing chart showing the normal shutter operation timing of the interline CCD; and FIG. 10 is a timing chart showing the high-speed shutter operation timing of the interline CCD.

DETAILED DESCRIPTION OF THE PREFERRED EMBODIMENTS

An image signal processing apparatus according to the present invention will be described in detail below with reference to the accompanying drawings, while taking an image pickup device as an example.

Figure 1:
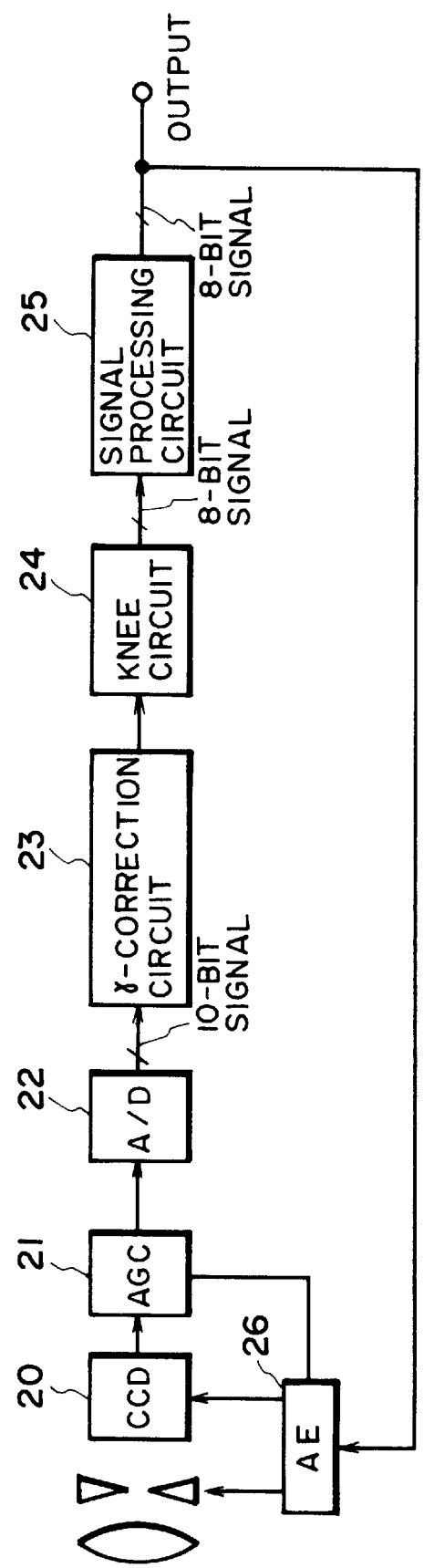
FIG. 1 is a block diagram showing the arrangement of a conventional image pickup device.
Figure 2A:
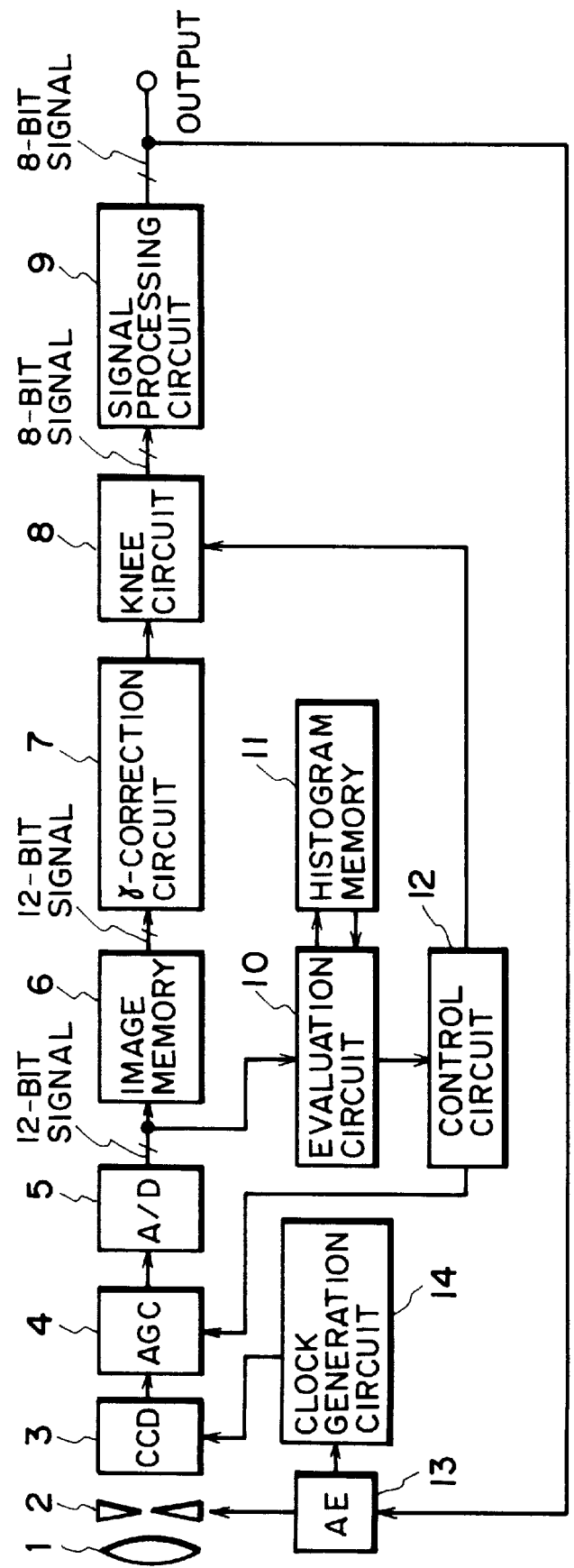
FIG. 2A is a block diagram showing an image pickup device according to the first embodiment of the present invention.

FIG. 2A is a block diagram showing the overall image pickup device according to the first embodiment of the present invention. Incident light from an object is incident on a photoelectric conversion unit comprising a CCD (Charge Coupled Device) 3 via a lens 1 and an iris 2 for adjusting the light amount, and is then converted into a color video signal by the following processing.

In the CCD 3, a photoelectric charge generated by a light-receiving unit is transferred to a transfer unit, and is output as an output signal. The gain of this signal is controlled by an AGC circuit 4, and the gain-controlled signal is converted by an A/D converter 5 into a 12-bit digital signal. The output signal from the A/D converter 5 is stored in an image memory (field memory) 6. A γ-correction circuit 7 performs normal γ correction, and a KNEE circuit 8 nonlinearly suppresses a high-luminance signal to assure a certain dynamic range.

On the other hand, the digital signal after A/D conversion is input to an evaluation circuit 10 as a 12-bit output. The evaluation circuit 10 performs evaluation on the basis of image information over one frame with reference to information in a histogram memory 11, and supplies an output signal based on the evaluation result to a control circuit 12 for controlling the KNEE circuit 8 and the AGC circuit 4. The control circuit 12 appropriately performs KNEE correction of a luminance signal, as will be described later, and fine processing in units of frames can be realized in correspondence with each photographing frame. In this embodiment, the 12-bit digital signal is subjected to γ correction and nonlinear processing such as KNEE correction to obtain an 8-bit signal, and the dynamic range of the high-luminance signal can be broadened. The output compressed by the KNEE circuit 8 is supplied as 8-bit data to match a signal processing circuit 9, which performs image operation processing at a resolution of 8 bits. The output signal from the signal processing circuit 9 is output as a color video signal, and is also input to an AE circuit 13. The AE circuit 13 generates an iris control signal for controlling the iris, and supplies a shutter speed control signal for controlling clocks for driving the CCD to a clock generation circuit 14.

The operation of the KNEE circuit will be described below.

Figure 2B:
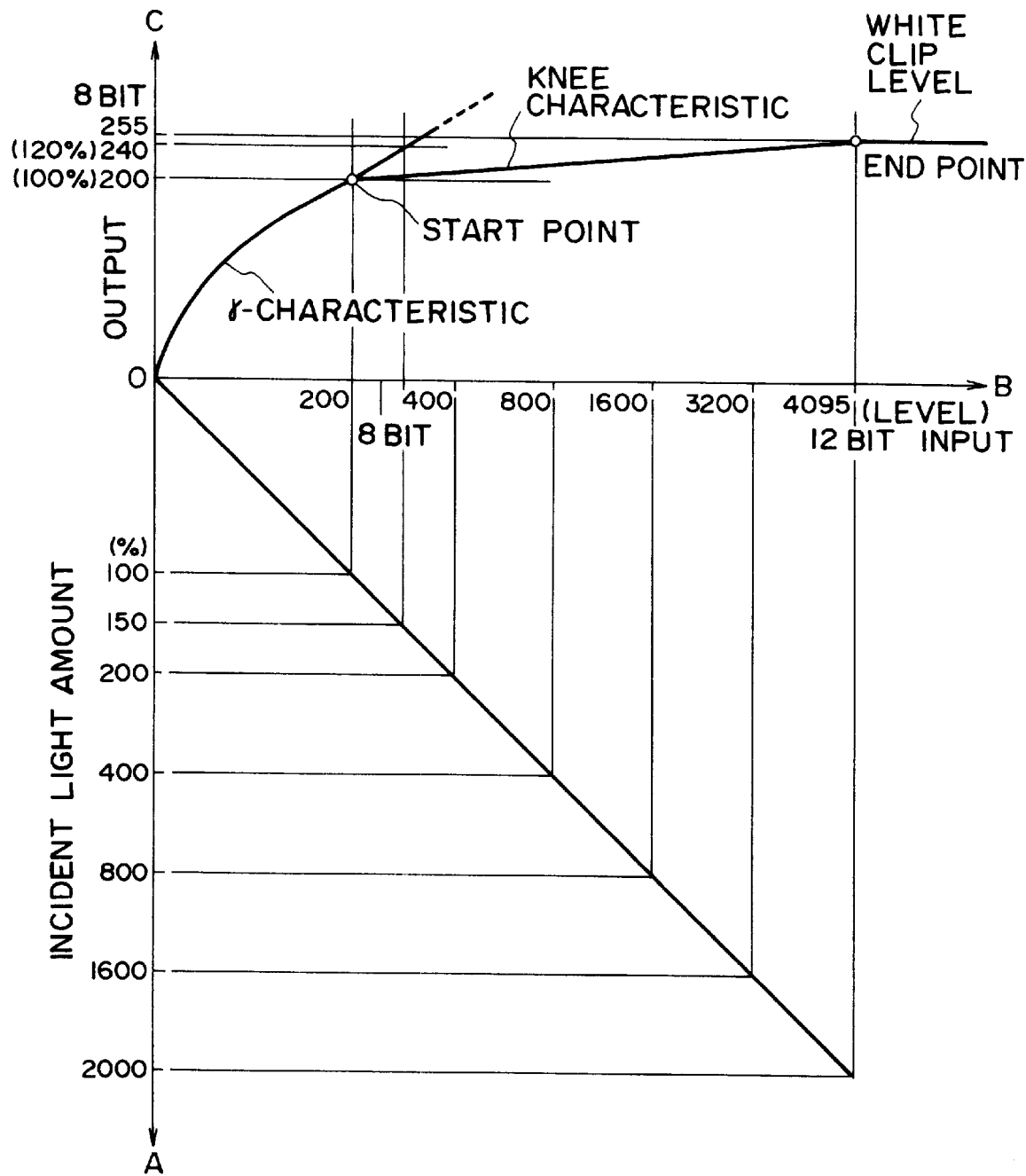
FIG. 2B is a graph showing a nonlinear characteristic curve according to the first embodiment of the present invention.

FIG. 2B is a graph showing a nonlinear characteristic curve according to the first embodiment of the present invention. The incident light amount is plotted along an ordinate A in FIG. 2B, and a 12-bit converted signal is plotted along an abscissa B in FIG. 2B. FIG. 2B shows conversion processing for outputting a quantization result of a signal corresponding to the incident light amount by A/D conversion as a 12-bit signal. FIG. 2B also shows processing for performing nonlinear conversion of the 12-bit input signal plotted along the abscissa B in FIG. 2B into 12-bit data by digital processing while an output signal which is compressed to 8 bits by the γ correction and KNEE correction is plotted along an ordinate C.

When 12-bit data (abscissa B) is nonlinearly converted by digital processing, output data has a γ characteristic (e.g., $y=x^{0.45}$) defined by a γ curve while the output signal level falls within a range from a zero level to a level corresponding to a crossing point between an inclined line for defining a KNEE characteristic and the γ curve. When the output signal level exceeds this upper limit level, output data is KNEE-compressed. When the input signal exceeds a predetermined level, output data is set to be a white clip level (a predetermined value defined by the number of output bits, e.g., an output maximum value=255 levels).

Therefore, the output can be prevented from being saturated until the input signal level reaches the predetermined level.

The KNEE compression is determined by the inclination of the KNEE characteristic. In general, the two ends (start and end points in FIG. 2B) of the inclined line are set to determine the inclination of the KNEE characteristic. As an example for changing the KNEE characteristic in correspondence with a histogram, in a histogram which has a high appearance frequency of luminance data at the light side, the inclination angle of the KNEE characteristic is increased, so that the KNEE characteristic is inclined in a direction to be separated from the white clip level, thus assuring a resolution for a high-level input signal. Conversely, in a histogram which has a high appearance frequency of luminance data at the dark side, the inclination angle of the KNEE characteristic is decreased, so that the KNEE characteristic becomes close to the white clip level, and a high resolution can be obtained for a low-level input signal. Note that the histogram in this embodiment evaluates the appearance frequency distribution of the numbers of samples counted in groups obtained by dividing the brightness in units of 100 levels. Thus, the capacity of the histogram memory can be decreased.

Examples of a method of controlling the evaluation value and the KNEE characteristic will be explained below.

Figure 3:
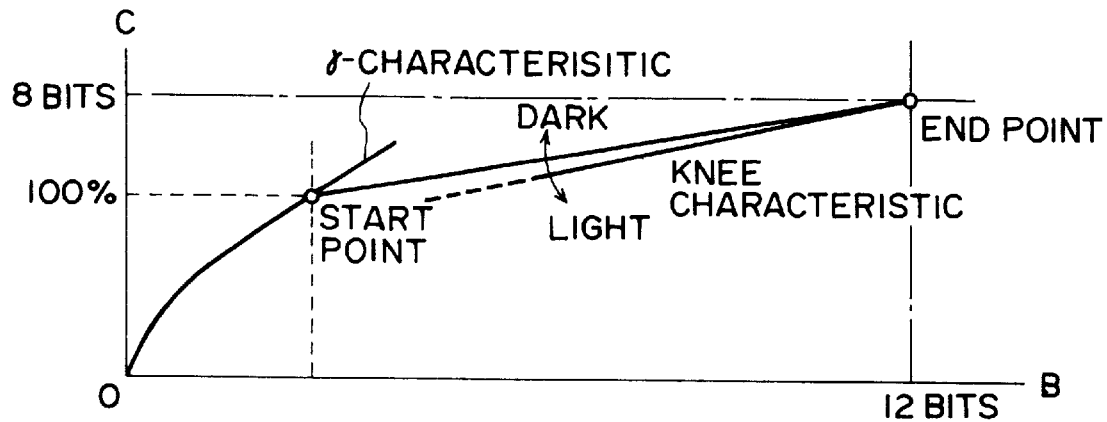
FIG. 3 is a graph showing a nonlinear characteristic curve according to another embodiment of the present invention.

The first method is characterized in that a crossing point between the highest level (4,095 along the axis B) of the input signal and the highest level (255 along the axis C) of the output signal is defined as an end point, and the inclination of the KNEE characteristic is set in correspondence with the histogram of the input signal to calculate a start point as a crossing point between the γ curve and 200 levels of the output signal, as shown in FIG. 3. The inclination of the KNEE characteristic is set as described above. That is, in a histogram which has a high appearance frequency of luminance data at the light side, the inclination angle of the KNEE characteristic is increased; in a histogram which has a high appearance frequency of luminance data at the dark side, the inclination angle of the KNEE characteristic is decreased.

Figure 4:
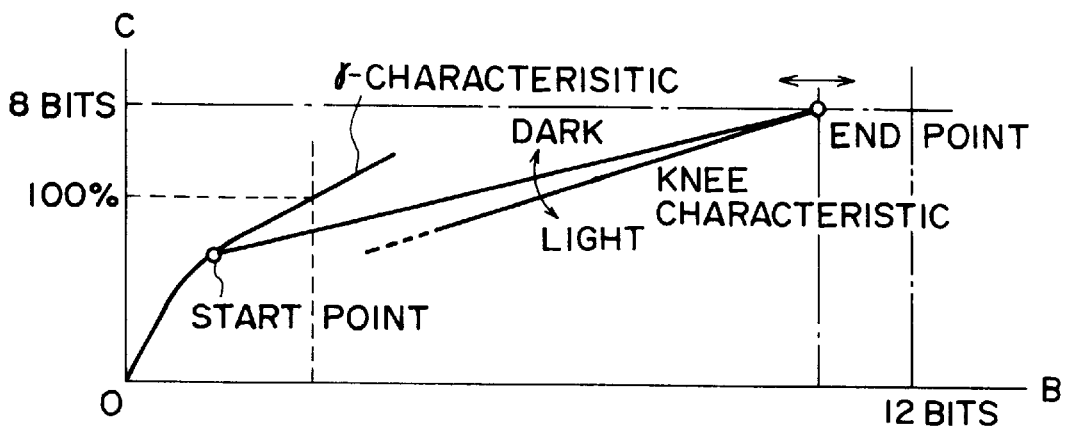
FIG. 4 is a graph showing a nonlinear characteristic curve according to another embodiment of the present invention.

The second method is characterized in that a crossing point between the highest level in one frame of the input signal and the outputtable highest level (255 along the axis C) is defined as an end point, and a start point as a crossing point with the γ curve is calculated based on the inclination of the KNEE characteristic set in correspondence with the histogram of the input signal, as shown in FIG. 4. The inclination of the KNEE characteristic is set as in the first method. That is, in a histogram which has a high appearance frequency of luminance data at the light side, the inclination angle of the KNEE characteristic is increased; in a histogram which has a high appearance frequency of luminance data at the dark side, the inclination angle of the KNEE characteristic is decreased.

Figure 5:
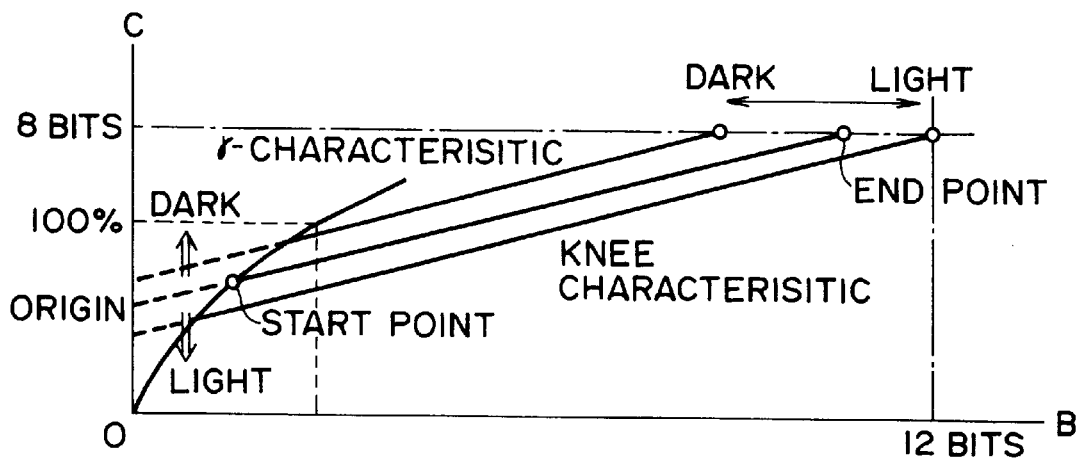
FIG. 5 is a graph showing a nonlinear characteristic curve according to another embodiment of the present invention.

The third method is characterized in that a crossing point between the extended line of a line having an inclination defining the KNEE characteristic and the ordinate C is set as an origin, the position of the origin of the inclined line is varied along the ordinate C, and the KNEE inclination is set in correspondence with the histogram of the input signal, and a start point as a crossing point with the γ curve is calculated by translating the inclined line along the ordinate C while the inclination is constant, as shown in FIG. 5. For example, in a histogram which has a high appearance frequency of luminance data at the light side, the origin is set at the low-level side of the output signal along the ordinate C, so that the resolution of a high-luminance range can be assured, and the white clip point can be set at high level. Conversely, in a histogram which has a high appearance frequency of luminance data at the dark side, the origin is set at the high-level side of the output signal along the ordinate C, thus assuring the resolution of a low-luminance range.

Figure 6:
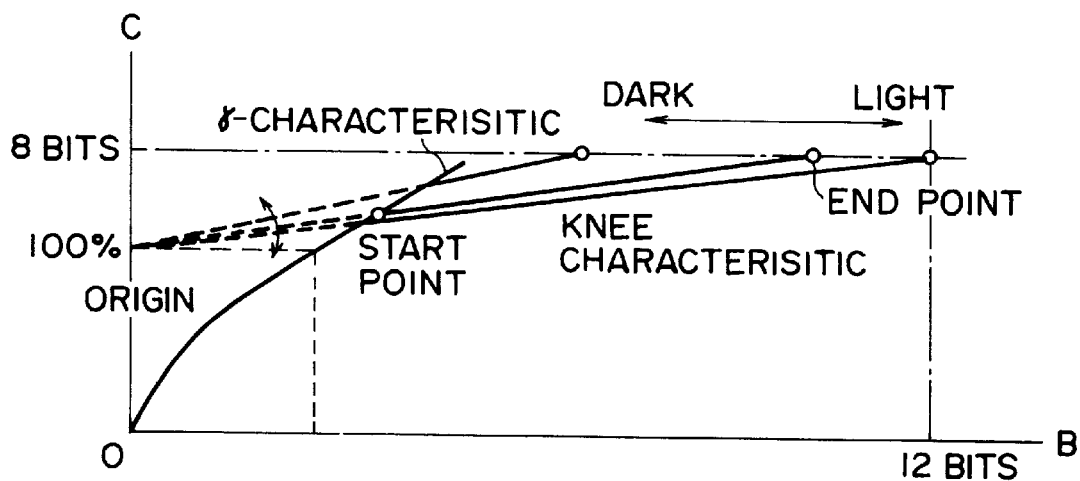
FIG. 6 is a graph showing a nonlinear characteristic curve according to another embodiment of the present invention.

The fourth method is characterized in that the origin of a line having an inclination defining the KNEE characteristic is fixed at 100% (200 levels) of the output signal along the ordinate C, and a start point as a crossing point with the γ curve is calculated based on the inclination of the KNEE characteristic set in correspondence with the histogram of the input signal, as shown in FIG. 6. The inclination of the KNEE characteristic is set in a manner opposite to the first method. That is, in a histogram which has a high appearance frequency of luminance data at the light side, the inclination angle of the KNEE characteristic is decreased; in a histogram which has a high appearance frequency of luminance data at the dark side, the inclination angle of the KNEE characteristic is increased.

As has been described above, optimal image processing is performed for the output from the image memory on the basis of image data over one photographing frame.

In this manner, since the use of the image memory allows correction of a time delay required for evaluation and generation of control signals, operations of optimal image processing in units of frames can be executed without causing a time "difference".

As another embodiment, information before being stored in the image memory may also be supplied to the evaluation means to use previous information (previous frame), and nonlinear processing may be executed in correspondence with the evaluation result.

In the above-mentioned embodiment, the evaluation means attains evaluation using the luminance histogram of an image input signal, and the operation means performs nonlinear compression operations. However, the present invention is not limited to this embodiment. For example, the image signal processing apparatus according to the present invention may be constituted by evaluation means which attains evaluation using a luminance peak value, luminance Min-Max data, a luminance average value, a luminance central value, a luminance variance, and the like, and operation means which performs nonlinear conversion (Min-Max fixed), nonlinear expansion operations, nonlinear shift, linear compression operations, linear expansion operations, addition shift, subtraction shift, and the like.

Color information, e.g., white balance may be controlled in correspondence with the result from the evaluation means. As evaluation means for evaluating color information, means which evaluates a color histogram, a color peak value, color Min-Max data, a color average value, a color central value, a color variance, or the like may be used.

Furthermore, an 8-bit input digital signal may be converted into a 6-bit output signal, and may be applied to a display such as a liquid crystal display device. Note that the method of setting parameters for determining the KNEE inclination is not limited to that in the above embodiment.

As described above, according to the image signal processing apparatus of the embodiment of the present invention, since an image of an input signal is evaluated, and the input signal is subjected to operation processing to obtain a maximum variance of the signal in correspondence with the evaluation result, fine processing in units of frames can be realized in correspondence with each frame. Also, since the image memory means is arranged, optimal operation processing for each frame can be executed without a delay time.

The second embodiment of an image processing apparatus according to the present invention will be described in detail below with reference to the accompanying drawings while taking an image pickup device as an example.

Figure 7:
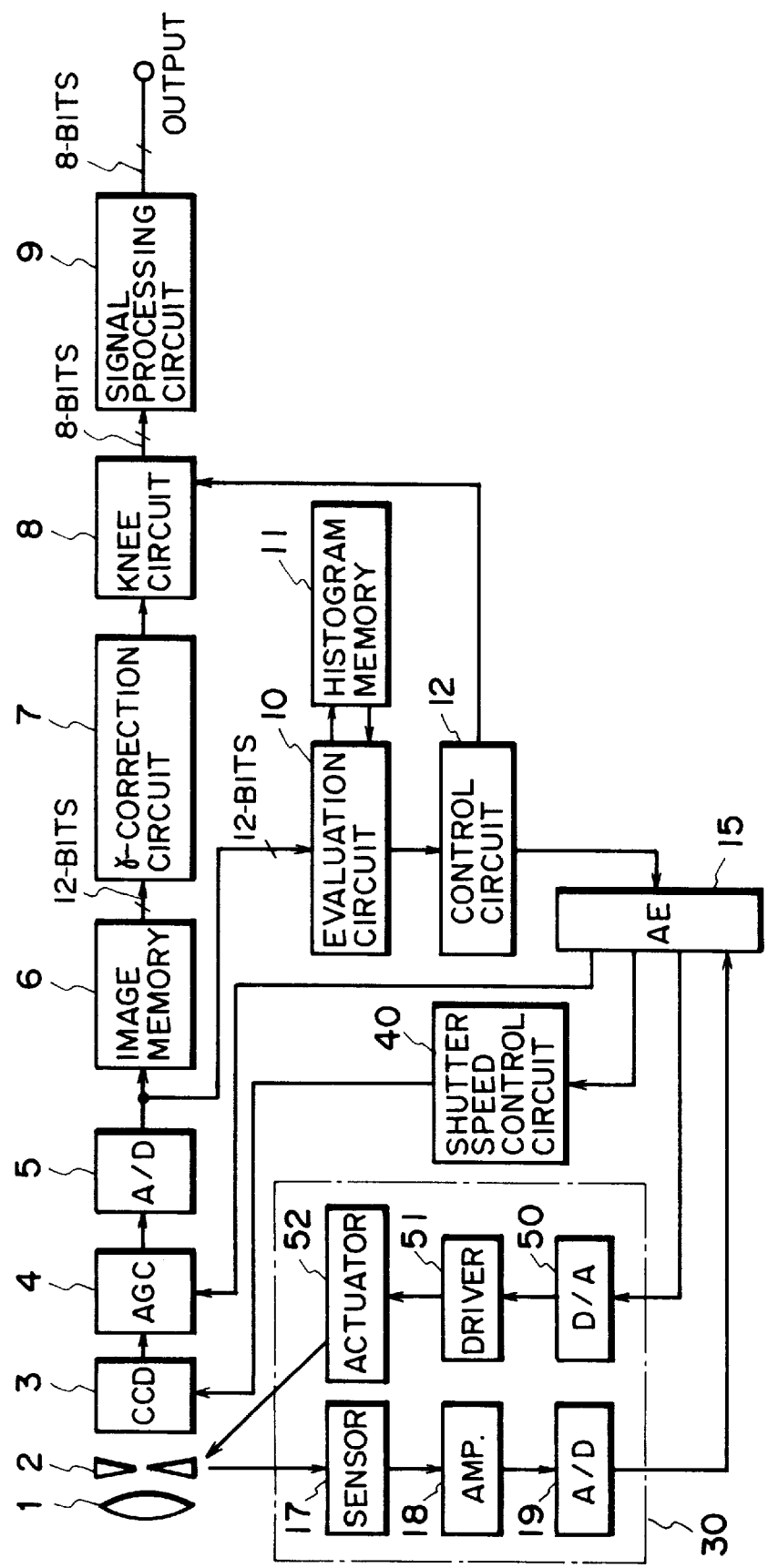
FIG. 7 is a block diagram showing an image pickup device according to the second embodiment of the present invention.

FIG. 7 is a block diagram showing the overall image pickup device according to the present invention, and the same reference numerals in FIG. 7 denote the same parts as in FIGS. 1 to 6.

An evaluation circuit 10 performs evaluation based on image information over one frame with reference to information in a histogram memory 11, and supplies an output signal based on the evaluation result to a control circuit 12 for controlling a KNEE circuit 8 and an AGC circuit 4. The control circuit 12 performs KNEE correction of a luminance signal, as will be described later, and fine processing in units of frames can be realized in correspondence with each photographing frame. An output compressed by the KNEE circuit 8 is supplied as 8-bit data to match a signal processing circuit 9, which performs image operation processing at a resolution of 8 bits. The output signal from the signal processing circuit 9 is output as a color video signal. The control circuit 12 controls an iris control circuit 30, a shutter speed control circuit 40, and the AGC circuit 4 via an AE (automatic exposure control) circuit 15.

An image pickup system will be described below. In general, a system (varying means) for adjusting the output signal level in correspondence with photographing contents is constituted by three parameters, i.e., an iris, shutter, and AGC. In a histogram which has a high appearance frequency of luminance data at the light side, the iris is closed, the shutter speed is increased, and the gain is decreased. Conversely, in a histogram which has a high appearance frequency of luminance data at the dark side, the iris is opened, the shutter speed is decreased, and the gain is increased.

Normally, in an NTSC system, the shutter speed is set to be 1/60 sec., the gain (amplification factor) is set to be about 1, and the iris is controlled in correspondence with photographing contents under this condition. Control based on only the parameter of the iris will be described below.

A CCD 3 supplies an analog output signal to the AGC circuit 4, and the output signal from the AGC circuit 4 is converted into a 12-bit digital signal by an A/D converter 5. The output from the AE circuit 15 is converted into an analog signal by a D/A converter 50, so that a photographing frame is maintained in an optimal exposure state with reference to the evaluation result of the frequency distribution of the signal level based on the histogram so as to obtain a proper exposure in correspondence with the state of the frame. A driver circuit 51 is controlled by the output signal from the D/A converter 50 to drive an actuator circuit 52. The actuator circuit 52 drives an iris 2. The driving result is detected by an iris sensor 17 such as a Hall element, and is converted into a digital signal by an A/D converter 19 via a sensor amplifier 18. The digital signal is supplied to the AE circuit 15. The AE circuit 15 compares the supplied digital signal with a control signal output to the D/A converter, and continues the driving operation until a predetermined result is obtained, thus realizing a target iris value.

When a binary code type position encoder is used, since digital data can be directly obtained, the A/D converter can be omitted.

The shutter operations at a normal shutter speed (1/60 sec) and a high shutter speed (e.g., 1/120 sec) in the CCD will be explained below with reference to FIGS. 8 to 10.

FIG. 8 shows an interline CCD. Electric charges accumulated on a plurality of pixels 31a, 31b, . . . , and 32a, . . . , and the like are simultaneously transferred to vertical transfer units 31V, 32V, . . . in response to a read-out pulse generated during a V blanking period. Upon elapse of the V blanking period, signals from the vertical transfer units are transferred to an output register 41 in units of lines in response to vertical transfer pulses, and are then output from the output register in units of pixels in response to output pulses.

FIG. 9 shows the operation timing at a normal shutter speed of the interline CCD. (a) of FIG. 9 shows a VBLK pulse, (b) of FIG. 9 shows the above-mentioned read-out pulse, (c) of FIG. 9 shows the vertical transfer pulse, and (d) of FIG. 9 shows a reset pulse. At the normal shutter speed, the reset pulse is generated simultaneously with the end of the read-out operation, and the next accumulation is started immediately. (e) of FIG. 9 shows the accumulation time.

FIG. 10 shows the timing when the interline CCD shown in FIG. 8 is operated in a high shutter speed (e.g., 1/120 sec) mode. The difference from FIG. 9 is the timing of the reset pulse. The accumulation time shown in (e) of FIG. 10 becomes a period between the reset pulse shown in (d) of FIG. 10 and the read-out pulse shown in (b) of FIG. 10, and is ½ that shown in (e) of FIG. 9. Such a high-speed shutter driving operation is effectively used when the above-mentioned iris control is to be limited.

As another embodiment, control for setting the gain of the AGC to be larger 1 in a photographing operation with an insufficient light amount, and control for, when an analog signal other than a CCD output is directly input to the AGC circuit, controlling the output signal to fall within the dynamic range of the A/D converter using the gain of the AGC in place of the iris and the shutter are performed.

As described above, according to this embodiment, since the image memory means is arranged, and operation processing is performed for an output signal from the image memory means, the image processing apparatus which can perform fine operation processing such as nonlinear processing in units of frames in correspondence with each photographing frame, and can effectively utilize the dynamic range of the digital processing circuit, can be realized.

What is claimed is:

1. An image pickup apparatus comprising:
    image pickup means having an optical system, for generating an image signal;
    quantization means for quantizing the image signal generated by said image pickup means to provide digital data which have an N bit resolution;
    conversion means for bit-resolution-converting the digital data provided by said quantizing means into digital data which have an M bit resolution, wherein M is less than N, to output image pickup information; and
    feed-forward loop means for generating image evaluation information by using the digital data of the N bit resolution and for controlling characteristics of the bit-resolution conversion of said conversion means by using the image evaluation information.

2. An apparatus according to claim 1, wherein the characteristics of the bit-resolution conversion of said conversion means are nonlinear characteristics.

3. An apparatus according to claim 2, wherein the characteristics of the bit-resolution conversion of said conversion means have a knee characteristic, and wherein said feed-forward loop means determines a gradient of the knee characteristic on the basis of the image evaluation information.

4. An apparatus according to claim 2, wherein the characteristics of the bit-resolution conversion of said conversion means have a gamma characteristic.

5. An apparatus according to claim 1, wherein the image evaluation information is a histogram of luminance data.

* * * * *